T. W. Lackore,
Hay Elevator.
No. 112,357. Patented Mar. 7, 1871.

Witnesses
A. P. Wakefield
E. A. West

Timothy W. Lackore
Inventor.

United States Patent Office.

TIMOTHY W. LACKORE, OF WORTH, ILLINOIS.

Letters Patent No. 112,357, dated March 7, 1871.

IMPROVEMENT IN ELEVATORS AND CARRIERS.

The Schedule referred to in these Letters Patent and making part of the same.

I, TIMOTHY W. LACKORE, of the town of Worth, in the county of Cook and State of Illinois, have invented certain new and useful Improvements in Elevators and Carriers, of which the following is a full description, reference being had to the accompanying drawing making a part of this specification, in which—

Figure 1:
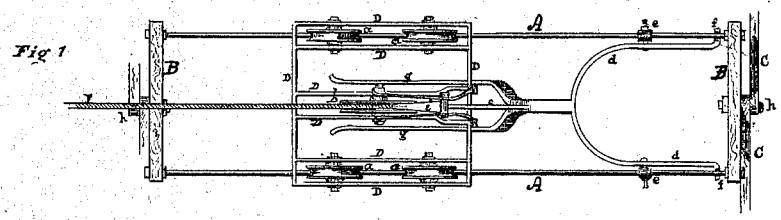

Figure 1 is a top view.

Figure 2:
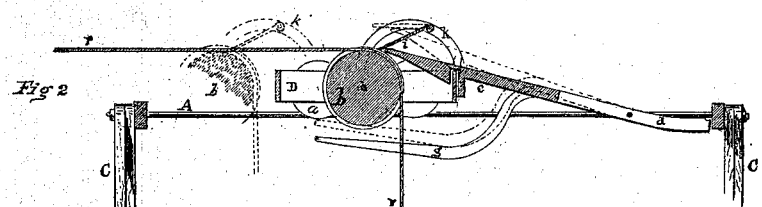

Figure 2, a longitudinal vertical section.

Figure 3:
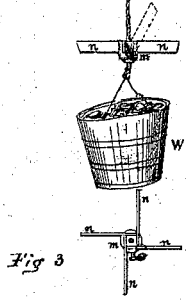

Figure 3, a detail of the trip.

Figure 4:
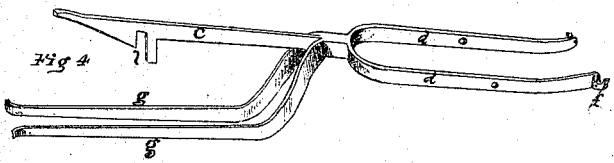

Figure 4, a detached view of the dog, enlarged.

My improvement relates to that class of apparatus used for unloading hay, coal, and other articles.

In the drawing—

A A represent two iron rods, from five-eighths to three-fourths of an inch thick, of such length as may be necessary, the ends of which are supported on cross-bars B B, which cross-bars, as shown, are pivoted at $h$ to the supports C, the length of which supports depends upon the height at which the rods are to be placed.

These rods may be about eleven inches apart, and they form a track on which the wheels $a$ move.

The several parts D, together, form a frame about one foot square, composed of two transverse and six longitudinal bars.

Between each pair of the outer bars are two wheels, $a$, about four inches in diameter, so arranged as to move upon the rods A; and between the two inner bars is a pulley, $b$, over which the rope $r$ passes, to one end of which is attached the weight $w$, to be raised, and at the other end is the power.

A catch, $i$, is pivoted in some suitable support, $k$, which can be secured to some part of the frame.

The catch is so arranged that the end comes in contact with the rope $r$ in such a manner as to permit the rope to move freely in the direction required to raise the weight, but prevent its movement in the opposite direction.

$c$ is a dog, the rear end of which is forked, and each prong, $d$, is pivoted upon one of the rods A at $e$.

Two other prongs, $g$, extend downward and forward from $c$.

In $c$ is a notch, $l$, which drops over and upon the rear cross-bar of the frame D, holding the frame in place while the weight is being elevated.

To the rope is secured a device for tripping the dog, a top view of which is seen in fig. 3.

It consists of a central piece, $m$, through which the rope passes, in which are pivoted four arms, $n$, so that the arms can be elevated but cannot fall below a horizontal position.

This device is secured to the rope by a set-screw, $o$, and can be raised or lowered at will.

The frame D can be made of iron.

The operation of my device is as follows:

The position of the parts when the weight is ready to be raised is shown in fig. 2, the dog preventing the frame or car D from being drawn forward. The power being applied, the weight will be raised until the arms $n$ of the trip come in contact with the arms $g$ of the dog, between which arms the rope passes, when the dog will be raised, releasing the frame or car D, which will then be drawn forward upon the track A to the point where the weight is to be left. After the weight has been deposited the car must be returned to its former position. The arms $n$, being pivoted as described, will, as the rope descends, pass through between the arms $g$.

When the parts are in the position shown in fig. 2 the point of the dog holds up the catch $i$ so that it does not come in contact with the rope, which then is free to move in either direction.

There is an advantage in having the trip adjustable at different points on the rope, as the height to which the weight will be raised can be varied.

There is also an advantage in having the bars B pivoted as described, as the track can be turned a little to either side to facilitate the attachment of the weight to the rope, since, when the track is tipped up on one side, the rope can be carried further from the perpendicular line than otherwise without coming in contact with the arms $g$, but it is not essential to pivot the track.

The track can be of any desired length, with supports at proper intervals.

The track may be somewhat inclined, so that the car D, after the weight has been deposited, will run back by gravity; or it can be drawn back by means of a cord.

The elevated track can be readily removed from one place to another, no matter how long, being made in suitable sections.

The ends $f$ of the prongs $d$ are turned out so as to pass under the rods A, forming stops, which prevent the dog from passing below a given point.

The arms of the trip will, two of them, at least, come in contact with the prongs $g$ in any position which it will naturally assume.

The track may be stayed at the ends by cords or rods, and other supports than C may be used.

What I claim as new is as follows:

1. The adjustable or swinging frame, consisting of the rails A, secured to the end pieces B, the latter being pivoted to their supports, substantially as set forth.

2. The combination of the swinging frame with the truck D, provided with the wheels $a$, the pulley $b$, and dog $e$, all constructed and arranged to operate substantially as described.

3. The dog $c$, provided with the arms $g$ and $d$, and so pivoted to the rails $a$ that it can be adjusted thereon to hold the truck at any desired point, substantially as set forth.

4. The trip, consisting of the arms $m\ m$, hinged to a central block having a hole through it for securing it to the rope, and having a set-screw, $o$, or its equivalent, whereby the trip may be adjusted higher or lower thereon, substantially as described.

TIMOTHY W. LACKORE.

Witnesses:
   A. P. WAKEFIELD,
   E. A. WEST.